March 6, 1962 G. D. KISH 3,024,130
PROCESS OF BONDING A BITUMINOUS ENAMEL PROTECTIVE COATING
TO A SUITABLE BASE SUCH AS METALLIC PIPES
AND PIPE COUPLINGS
Filed March 4, 1959
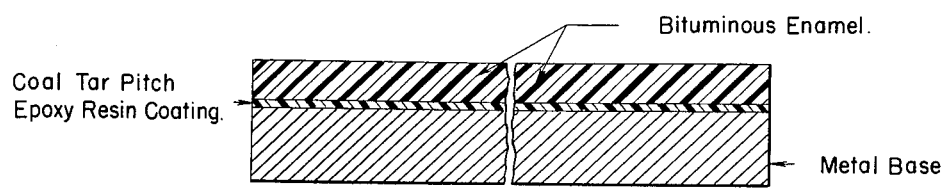
INVENTOR.
GEORGE D. KISH
BY
ATTORNEY.

United States Patent Office 3,024,130
Patented Mar. 6, 1962

3,024,130
PROCESS OF BONDING A BITUMINOUS ENAMEL PROTECTIVE COATING TO A SUITABLE BASE SUCH AS METALLIC PIPES AND PIPE COUPLINGS
George D. Kish, Derrick City, Pa., assignor to Dresser Industries, Inc., Dallas, Tex., a corporation of Delaware
Filed Mar. 4, 1959, Ser. No. 797,033
37 Claims. (Cl. 117—75)

This invention relates to a process for protecting metallic surfaces and, while not limited thereto, is more particularly concerned with the protection of metallic pipes and pipe couplings.

Pipe lines for the transmission of oil, water, gas, and the like are customarily formed from many sections of steel pipe interconnected by welding, flanged joints or, where required by some type of flexible coupling element which provides a fluid-tight seal between the pipe sections but at the same time provides a sufficiently flexible joint to accommodate the expansion and contraction of the line under the conditions of service. Flexible couplings commonly in use consist of sleeves or "middle rings" which are slipped over the ends of the adjacent pipe sections, and "followers" which are slipped over the pipe sections on each side of the middle ring and are then drawn against the ends of the middle ring by means of bolts. Suitable gaskets placed at the ends of the middle rings are compressed by the action of the followers to provide the desired fluid-tight seal.

It is well known that such underground pipelines are continuously subject to corrosion attack by water and by the soil through which they pass and as the result of stray electric currents. It is customary, therefore, to coat the exterior surfaces of the pipes with various types of protective coatings, e.g. hot-melt bituminous compositions, and the like. In many instances, however, the soil has an abrasive action on these coatings and breaks in the continuous coating film are caused. Such breaks expose the pipe surface and provide the seat for subsequent corrosion attack. While much thought and attention has been given to the problem of adequately protecting pipelines against attack by the various destructive agencies encountered under conditions of use, and many proposals have been made and put into practice, it is well recognized that greater protection than that which can be obtained by these known methods is highly desirable and of great practical importance.

One of the most serious problems in this field is the problem of maintained adherence of the coating upon the surface to which it is applied, particularly when the pipe is exposed to wide variations in temperature and to mechanical shocks. A further problem arises from the fact that pipelines for the transmission of water must be coated with materials which will not contaminate the water and there are, therefore, limitations with respect to the types of material which can be employed. There have been developed so-called pipe enamels which have been extensively used and these are well-recognized compositions having established specifications. In order to improve the bond between the surface to be protected and the pipeline enamel it has heretofore been proposed to use a "primer" which generally consists of coal-tar pitch and coal-tar oils. While adherence is improved by means of these primers, the problem of disbonding still exists and even the most rigid specifications allow a substantial amount of disbonding to be tolerated.

It is a principal object of the present invention to provide a method of treating pipes, pipe couplings and other metallic surfaces to provide a protective coating upon the surfaces which has high protecting action and yet which has high bonding characteristics and avoids the limitations of coatings heretofore proposed.

It is a further object of the invention to provide a process of the character indicated which is suitable for application to all types of pipeline members, including those to be used for the transmission of water.

It is another object of the invention to provide a plural-phase coating which strongly adheres to the metallic surface with which it is associated notwithstanding wide temperature changes and notwithstanding exposure to very low temperatures.

It is a further object of the invention to provide a method of protecting metallic surfaces from corrosion attack.

In accordance with the invention, a metallic surface is treated to provide a two-phase coating which is characterized by the combination of a coal-tar enamel with a coating composition comprising a coal-tar pitch containing epoxy resins. In the plural-phase coating applied by the process of the invention, the composition comprising coal-tar pitch and epoxy resin is in contact with the surface being protected and the coal-tar enamel is in contact with the epoxy resin composition to provide a protective coating resulting from the cooperation of the two coating layers.

In carrying out the process of this invention, the pipe, coupling, or other metal surface to be treated is first freed from grease, oil, dirt, rust, scale and the like in conventional manner, using the techniques commonly employed in the preparation of surfaces for the application of bituminous compositions in the pipe-coating art. The thus-prepared article, e.g. pipe or coupling, is then sprayed at room temperature, e.g. 65–80° F., with the coal-tar pitch epoxy resin composition, spraying being continued to provide a coating of a thickness ½ to 5 mils over all surfaces to be coated. The article with its thus-applied coating of coal-tar pitch-epoxy resin composition is then substantially immediately heated to effect a partial curing of the coating composition but heating is discontinued before the composition has fully cured and before it has become dry to the touch. Then, with its coal-tar pitch epoxy resin coating partially cured and still wet to the touch, the coated article is substantially immediately immersed for a few seconds in a molten bath of the coal-tar enamel composition. Thereupon, the article is withdrawn from the molten coating bath and rotated above the bath until the coal-tar enamel coating has congealed sufficiently that it no longer flows upon continued rotation of the article. The article with its thus-applied plural-phase coating is then allowed to cool at room temperature.

It is a feature of the invention that by reason of the application of the coal-tar enamel composition to the underlayer containing epoxy resin before the underlayer has "set" or "cured" and while it is still fresh and "wet to the touch" there is a simultaneous curing and cooling action of the superimposed coating compositions with the heat from the coal-tar enamel serving to promote final curing of the coal-tar pitch-epoxy resin composition.

It is a further feature of the invention that the interaction between the coal-tar enamel and the coal-tar pitch epoxy resin composition provides a coating on the coated surface which is strongly resistant to disbonding and has high bonding characteristics even under low temperature conditions.

It is another feature of the invention that the application of the coal-tar enamel and the coal-tar pitch-epoxy resin coating in the manner described causes the two compositions to adhere firmly to each other during the application steps.

Other objects and features of the invention will be apparent to those skilled in the art from the following more detailed description of the invention.

The single FIGURE of the drawing illustrates an embodiment of the invention.

The coal-tar pitch-epoxy resin composition which is employed in carrying out the process of this invention is suitably composed of 15 to 50 parts of epoxy resin and 50 to 85 parts of coal-tar pitch based on 100 parts by weight of the total content of resin and pitch. Coal-tar pitch-epoxy resin compositions suitable for use are those described, for example, in Whittier et al. U.S. Patent No. 2,765,288 of October 2, 1956. A particularly suitable composition of this type is that sold under the trade-name "Tarset" by the Pittsburgh Coke and Chemical Co.

As described in the Whittier et al. patent, the epoxy resins employed correspond with those described in U.S. Patent No. 2,528,417 of October 31, 1950, and U.S. Patent No. 2,500,449 of March 14, 1950. Coal-tar pitch is a product obtained from the distillation of coal-tar and typical coal-tar pitches are described, for example, in the book entitled "Asphalts and Allied Substances," by Herbert Abraham (5th ed.).

The solvents which are employed to produce suitable coating fluidity in the coal-tar pitch-epoxy resin composition are aromatic solvents, suitably those derived from coal-tar, and particularly useful is so-called "high-flash naptha" which is a mixture of aromatic hydrocarbons generally boiling within the range of 150 to 200° C. Other aromatic solvents such as benzol, toluol and xylol, and the like, may also be used.

As described in U.S. Patent No. 2,765,288, the coal-tar pitch-epoxy resin composition must be mixed with a curing agent or catalyst just prior to use and any of the well-known epoxy resin catalysts or curing agents may be employed such as those described in chapters 2, 3, 4 and 5 of the book entitled "Epoxy Resins—Their Application and Technology," by Henry Lee and Kris Neville (McGraw-Hill Book Company). Suitable catalysts, for example, are poly-functional amines, such as ethylene diamine, ethylene triamine, diethylene triamine, benzyl dimethylamine, 3-dimethyl-aminopropylamine, 3-diethylaminopropylamine, tetraethylene pentamine, and the like. These curing agents are conveniently employed in the amount of 0.05 to 0.25 part per part by weight of the total composition. As shown in Examples I to IV of U.S. Patent No. 2,765,288, the curing agent may be added to a mixture of all of the other components of the composition, or it may be premixed with the coal-tar pitch, or with the coal-tar pitch and solvent, or with the coal-tar pitch, solvent and filler, so long as the epoxy resin and the curing agent are not together prior to the time the composition is prepared for prompt use.

The pipe enamel which is employed in accordance with this invention for application to a freshly-applied wet coating of the epoxy resin-coal-tar pitch composition is preferably so-called "water-works enamel" but any of the other well-known pipe enamels commercially available may be suitably used. Water-works enamel meets the following specification of the American Water Works Association which is set forth in Standard Specification AWWA C203–57.

STEEL PIPE COATINGS

*Table 1*

CHARACTERISTICS OF AWWA COAL-TAR ENAMEL

| Test | Minimum | Maximum |
|---|---|---|
| Softening point—ASTM D36–26, °F | 220 | |
| Filler (ash)—ASTM D271–48, percent | 25 | 35 |
| Fineness filler, through 200 mesh—ASTM D546–41, percent | 90 | |
| Specific gravity at 25° C.—ASTM D71–52 | 1.40 | 1.60 |
| Penetration [1]—ASTM D5–52 at— | | |
| 77° F.—100 g. weight—5 sec | 10 | 20 |
| 115° F.—50 g. weight—5 sec | 15 | 55 |
| High-temperature test—at 160° F. (sag)—AWWA C203, Sec. 2.4.4(1), inch | | 2/32 |
| Low-temperature test—at −20° F. (cracking)—AWWA C203, Sec. 2.4.4(2) | | None |
| Deflection test [2] (initial heating)—AWWA C203, Sec. 2.4.4(3): | | |
| Initial crack, inch | 0.8 | |
| Disbonded area, sq. in | | 3.0 |
| Deflection test [2] (after heating)—AWWA C203, Sec. 2.4.4(4): | | |
| Initial crack, inch | 0.6 | |
| Disbonded area, sq. in | | 5.0 |
| Impact test [2]—at 77° F.—650 g. ball, 8-ft. drop—AWWA C203, Sec. 2.4.4(6): | | |
| Direct impact—disbonded area, sq. in | | 10.0 |
| Indirect impact—disbonded area, sq. in | | 2.0 |
| Peel test—AWWA C203, Sec. 2.4.4(5) | (3) | (3) |

[1] For anticipated minimum temperature exposures between 20° and −20° F., use enamels with penetration of 15 to 20 at 77° F.
[2] Choice of bond testing methods A or B by deflection (before heating), by deflection (after heating), or by impact shall depend upon laboratory equipment available.
[3] No peeling.

Pipe enamels are generally characterized by the limits of temperature which they will resist without disbonding in normal service without excessive deterioration and these enamels are accordingly commonly referred to as "narrow range" enamel, "moderate range" enamel, and "wide range" enamel. The above-described water works enamel is a form of wide-range enamel. The following typical specifications for pipe enamels are set forth, for example, in the article by Norman T. Shideler, entitled "Coal-Tar Coating for Protection of Underground Structures," which appears in the June 1957 issue of the periodical "Corrosion."

*Table 1*

TYPICAL SPECIFICATIONS—COAL TAR HOT APPLIED COATINGS

| Test | Narrow range enamel | Moderate range enamel | Wide range enamel | AWWA enamel C203–4 [1] | Hot pipeline enamel |
|---|---|---|---|---|---|
| Specific gravity at 25° C | 1.45–1.55 | 1.40–1.50 | 1.40–1.50 | 1.40–1.50 | 1.40–1.50 |
| Softening point (degrees F. ASTM D–36) | 190–200 | 195–205 | [2] 220 | [2] 220 | [2] 240 |
| Penetration ASTM—D–5: | | | | | |
| 100 g. 5 sec., 77° F | 0–2 | 2–6 | 7–11 | 10–20 | 1–3 |
| 200 g. 5 sec., 77° F | | | | | 2–6 |
| 50 g. 5 sec., 115° F | 2–8 | 8–20 | 14–28 | 15–55 | 5–15 |
| Ash, mineral filler percent by weight | 20–25 | 20–25 | 20–25 | 25–35 | 25–35 |
| Sag test: | | | | | |
| 7 hrs. at 120° F., inch | [3] 1/16 | | | | |
| 7 hrs. at 140° F., inch | | [3] 1/16 | | | |
| 24 hrs. at 160° F., inch | | | [3] 1/16 | [3] 1/16 | |
| 24 hrs. at 180° F., inch | | | | | [3] 1/16 |
| Cold cracking test: | | | | | |
| 5 hrs. at 30° F | None | | | | |
| 5 hrs. at 0° F | | None | | | |
| 5 hrs. at −10° F | | | | | None |
| 5 hrs. at −20° F | | | None | None | |
| Spark test 10,000 volts low amperage | None | None | None | None | None |

[1] Now superseded by AWWA C205–57 set forth above.
[2] Minimum.
[3] Maximum.

As indicated in the above-mentioned "Corrosion" article, a particularly effective pipe enamel having valuable temperature characteristics is formed from so-called "coal-digestion pitch." The preparation of a pipe enamel with coal-digestion pitch is described in Canadian Patent No. 396,904. Typical pipe enamels falling within the above-indicated specifications for AWWA water-works enamel and formed from coal-digestion pitch, straight distilled coal-tar pitch, or both, have the following characteristics:

|  | Coal-digestion pitch | Straight distilled coal-tar pitch | Mixture of coal-digestion pitch and straight distilled pitch |
|---|---|---|---|
| Penetration at— | | | |
| 32° F | 3.0 | 0.0 | 0.0 |
| 75° F | 10.0 | 0.5 | 2.0 |
| 115° F | 21.5 | 4.0 | 7.0 |
| Fusing point (cube),° F | 258 | 210 | 246 |
| Flash point (open-cup),° F | 345 | 350 | 348 |
| Ash (300 mesh mica), percent | 27.2 | 31.3 | 25.9 |
| Insoluble in benzol, percent | 51.7 | 46.0 | 55.7 |

These compositions are described on page 595 of volume 1 of "Asphalts and Allied Substances" by Herbert Abraham (5th ed.).

The preparation of coal-digestion pitch itself is described, for example, on page 531 of the above-identified book by Abraham and typical coal-tar pitch manufacturing procedures are described in U.S. Patents 2,124,843 (B. A. Anderton, of July 26, 1938), 2,174,184 (W. McK. Bywater, of September 26, 1939), and 2,249,412 (F. W. Yeager, of July 15, 1941).

In applying the plural-phase protective coating in accordance with the process of this invention, the surface to be coated is, as mentioned, first suitably cleaned by washing with an aromatic solvent, such as xylol, and wiping it with clean rags to remove oil and grease. The surface is then sand- or grit-blasted or wire-brushed to remove any rust, scale, paint, and the like which may be present. The preparation of the surface to receive the first coating is suitably carried out at room temperature. The coal-tar pitch-epoxy resin composition is then sprayed upon the clean surface while it remains at room temperature and heating of the article being coated at this stage is not generally necessary. However, if the article has been stored at substantially lower temperatures prior to being coated, it is advantageously allowed to come to room temperature before the first coating is applied. Application of the coal-tar pitch-epoxy resin composition is suitably effected by spraying, using spraying means of any convenient type such as sprayers commonly used in the application of bituminous coatings. Spraying is continued until a coating has been applied to all surfaces to be protected in a thickness of ½ to 5 mils. As previously mentioned, the coal-tar pitch-epoxy resin composition is prepared for application by incorporating the curing agent with the remaining components of the product. The curing agent should be added just prior to use and, in any case, the composition schuld be applied to the surface to be treated within 6 hours at room temperature from the time the curing agent is combined with the epoxy resin.

Substantially immediately after the coal-tar pitch epoxy resin composition has been sprayed upon the article the coated article is heated by bringing it into contact with air or other gas or gas mixture heated to a temperature of 200 to 650° F., preferably 300 to 400° F. The coated article is subjected to the action of the heated air for a time sufficient to effect partial curing of the composition but leaving it "wet to the touch." By the expression "wet to the touch" I mean to include the condition in which the underlayer will partially transfer to another object which may come into contact with it as well as the condition in which the underlayer is merely tacky and does not transfer.

While the time the coated article is subjected to the heated air will vary with the temperature, the weight of the article and the thickness of the walls of the article, the time suitable for each particular type of article can be readily determined by simple routine test.

Preferably, the heated air which is employed in the preceding step contains carbon monoxide and carbon dioxide in the following percentage ranges:

Carbon monoxide _____ 2 to 12%, e.g. 8%
Carbon dioxide _____ 2 to 12%, e.g. 4%

Substantially immediately following the above-described heating step, the coated article is immersed in a body of the molten bituminous coating to be applied, e.g. a coal-tar pitch enamel, maintained at a temperature of 450° to 525° F. The coal-tar pitch epoxy resin composition is still wet when immersed in the molten bituminous composition and the article is immersed for a time sufficient for the article to pick up a coating of $\frac{1}{16}$ to $\frac{1}{8}$" thickness, e.g. $\frac{3}{32}$" thickness. This generally involves a time of 2 to 5 seconds and a $\frac{3}{32}$" coating is obtained in about 4 seconds. It will be understood, therefore, that the immersion in the coal-tar enamel takes place rapidly. The coated article is then withdrawn from the coal-tar bath and rotated above the bath until the coating has congealed to a point that it no longer flows. The air temperature above the coal-tar bath is about 200 to 225° F. and the congealing period is about 45 seconds. The coal-tar pitch epoxy resin coating acts as an insulator between the molten coal-tar enamel and the metal of the article being treated so that the heat of the enamel is not dissipated into the metal too quickly and as the coal-tar enamel congeals, the final curing of the coal-tar pitch epoxy resin coating proceeds simultaneously by reason of the heat supplied by the bituminous outer coating. The congealing of the coal-tar enamel begins immediately upon withdrawal of the article from the molten bath and the simultaneous interaction between the two coating compositions provides a highly effective bond and a coated product is obtained which is effectively protected in service notwithstanding low temperature conditions which have led to the failure of previously proposed coatings. The fact that the coal-tar pitch epoxy resin composition is still wet and slippery when the outer bituminous coating is applied contributes to the eventual bond.

After the outer coating of coal-tar enamel has congealed so that it no longer flows, the coated article is removed from above the coating bath and is allowed to cool to room temperature to complete solidification of the coal-tar enamel and curing of the coal-tar pitch epoxy resin coating into a unitary two-phase coating of outstanding resistance to damage or disbonding in service, particularly service to which pipes and pipe couplings are subjected.

The process described above may be carried out in any convenient apparatus used for the handling of pipes, couplings and like articles in conventional coating and treating procedures and the process is not limited to any particular form of apparatus. For example, the article to be treated may be fastened to a supporting fixture suspended from an overhead chain conveyor and transported to a first station provided with a plurality of spray nozzles from which the coal-tar pitch epoxy resin composition is sprayed upon all surfaces of the article to be protected. After spraying, the article may move on, carried by the same conveyor, to a heating station which may be an enclosure of sufficient size to contain the largest article to be treated and provided with an inlet and an outlet for the heating gases. From the heating station, the article is again conveyed, as by the overhead chain conveyor, to the bitumen coating bath which may be in the nature of a vertically movable dipping tank into which the article is dipped for the necessary few seconds and is then held above the tank and rotated during the initial congealing period by means of a friction wheel on the supporting fixture in contact with a motor driven belt. The dipping tank is, of course, provided with the necessary insulation and heating means to maintain the body of molten bitumen at the desired temperature and with an inlet for continuously replenishing bitumen as it is used up. The article with its congealed outer coating is then suitably conveyed by an overhead chain conveyor or the like to a final cooling station prior to removal and shipment. It will be apparent from the foregoing that the article moves relatively rapidly through the entire series of processing steps and that there is need for no substantial interval between the several treating stations. Consequently, the process is particularly adapted for continuous operation and the treating apparatus can, therefore, be compact and no large storage areas for maintaining a supply of the articles between treating stages is necessary.

At the end of the coating period, the surface which has been treated has, as mentioned, strongly bonded to it a highly protective coating which is resistant to disbonding by mechanical action or by thermal action over a wide range of conditions and there is provided a coating which, when subjected to standard testing procedures, such as those described on pages 597 and 598 of "Asphalts and Allied Substances" (5th ed.), have been found to have advantageous characteristics not shared by coatings for pipelines and couplings heretofore known.

It will be understood that the two-phase coating of this invention may be used as the sole covering for the surface treated or, in the case of pipes, it may be combined with pipe wrappings of conventional type well-known in this field such as wrappings of asbestos felt, kraft paper, glass fiber webs, and the like. The wrappings are suitably applied over the outer coating of pipe enamel and the wrappings may be coated with a further coating of pipe enamel and then additional wrappings applied to provide the so-called double coat, double wrap.

It will also be understood that the above-described two-phase coating may be combined with other coatings if desired. For example, the article to be protected may be first coated before it is coated with the coal-tar pitch epoxy resin composition with a thermosetting coating composition such as phenolic resin coating composition as described in the Structural Steel Painting Council Handbook. This first coating is allowed to dry to the touch but not to set completely before application of the coal-tar pitch epoxy resin composition. When the coal-tar enamel is subsequently applied as the outer coating, the heat from the molten bitumen will simultaneously cause both the phenolic resin coating and the epoxy resin coating to cure completely. Furthermore, while application of the coal-tar pitch epoxy resin composition is advantageously and preferably effected by means of spraying, as described above, it is possible within the scope of this invention to use other methods of application known in the art of coating, such as brush application, roller application, and the like. The same is true with respect to the application of a first coating such as a phenolic resin coating composition mentioned above.

The following examples will serve more fully to define the invention but it is understood that they are intended for illustrative purposes only and are not to be interpreted as limitative of the invention.

EXAMPLE 1

A pipe coupling of the type shown, for example, in FIG. 1 of Pfefferle U.S. Patent No. 1,984,806, and of a size suitable for the interconnection of 2 in. pipe, with a wall thickness of 5/32 in. and weighing 9 pounds is thoroughly washed and rubbed with xylene and is then sand blasted to prepare a clean surface for coating, both the interior and the exterior of the coupling being treated in this manner. A bath of a coal-tar pitch-epoxy resin coating composition is prepared by introducing into a 25 gallon tank 20 gallons of an epoxy resin preparation having the following composition:

| | Weight percent |
|---|---|
| Epoxy ether resin from bis-phenol A and epichlorhydrin (melting point 9° C. and epoxy value 0.50) | 31 |
| Aromatic high-flash naphtha | 20 |
| Coal-tar pitch | 33 |
| Talc | 16 | to which is added 1 gallon of diethylene triamine as curing agent. Within 15 minutes after the curing agent has been added, the composition is sprayed at room temperature upon all surfaces of the coupling to provide a thickness of about 5 mils. There is also prepared in a dipping tank a supply of 30 gallons of a water works enamel meeting the AWWA C203-4 specification set forth above, sold under the name Waterworks Enamel, and having the following characteristics:

| | |
|---|---|
| Specific gravity at 25 C. | 1.40–1.50 |
| Softening point (degrees F., ASTM D–36) | [1] 220 |
| Penetration, ASTM D–5: | |
| 100 g. 5 sec., 77 F. | 10–12 |
| 200 g. 5 sec., 77 F. | ----- |
| 50 g. 5 sec., 115 F. | 15–55 |
| Ash, mineral filler, percent by weight | 25–35 |
| Sag test: | |
| 7 hrs at 120 F. | ----- |
| 7 hrs. at 140 F. | ----- |
| 24 hrs. at 160 F., inch | [2] 1/16 |
| 24 hrs. at 180 F. | ----- |
| Cold cracking test: | |
| 5 hrs. at 30 F. | ----- |
| 5 hrs. at 0 F. | ----- |
| 5 hrs. at −10 F. | ----- |
| 5 hrs. at −20 F. | None |
| Spark test: 10,000 volts low amperage | None |

[1] Minimum.
[2] Maximum.

This enamel is heated to 470° F. to render it fluid. After the coal-tar pitch epoxy resin composition has been applied to the coupling, the coupling is immediately moved into a heating zone where it is subjected to 1½ minutes to the action of air containing natural gas combustion products at a temperature of 625° F. The thus coated coupling was then immersed in the body of heated water works enamel in the dipping tank for 2.8 seconds and was then rotated in the air above the dipping tank which was at a temperature of 225° F. for about 1½ minutes until the outer coating of water works enamel had congealed sufficiently that it no longer ran. The coupling was then removed and allowed to cool to room temperature which required about 30 minutes.

EXAMPLE 2

A flexible pipe coupling of the type described above and illustrated, for example, in FIG. 1 of U.S. Patent 1,984,806, and of a size suitable for the interconnection of 6 in. pipe, having a wall thickness of about ¼ inch and weighing about 25 pounds, is blasted with steel grit to prepare a clean surface for coating, both the interior and the exterior of the coupling being treated in the same manner. A supply of a coal-tar pitch-epoxy resin coating composition is prepared by introducing into a 20 gallon tank, 15 gallons of an epoxy resin preparation having the following composition:

| | Weight percent |
|---|---|
| Epoxy ether resin from bis-phenol A and epichlorhydrin (melting point 25° C. and epoxy value 0.64) | 43.5 |
| Aromatic solvent (xylene) | 13.0 |
| Coal-tar pitch | 43.5 | to which are added 1/15 part of diethylene triamine as curing agent. Within 15 minutes after the curing agent has been added, the composition is sprayed upon all surfaces of the coupling to provide a thickness of about 5 mils. There is also prepared in a 10 gallon dipping tank a supply of 9 gallons of a "wide-range enamel" meeting the specification set forth above sold under the name Plasticized Enamel, and having the following characteristics:

| | |
|---|---|
| Specific gravity at 25 C. | 1.40–1.50 |
| Softening point (degrees F., ASTM D-36) | [1] 220 |
| Penetration, ASTM D-5: | |
| 100 g. 5 sec., 77 F. | 7–11 |
| 200 g. 5 sec., 77 F. | ----- |
| 50 g. 5 sec., 115 F. | 14–28 |
| Ash, mineral filler, percent by weight | 20–25 |
| Sag test: | |
| 7 hrs. at 120 F. | ----- |
| 7 hrs. at 140 F. | ----- |
| 24 hrs. at 160 F., inch | [2] 1/16 |
| 24 hrs. at 180 F. | ----- |
| Cold cracking test: | |
| 5 hrs. at 30 F. | ----- |
| 5 hrs. at 0 F. | ----- |
| 5 hrs. at −10 F. | ----- |
| 5 hrs. at −20 F. | None |
| Spark test: 10,000 volts low amperage | None |

[1] Minimum.
[2] Maximum.

This enamel is heated to 500° F. to render it fluid. After the coal-tar pitch epoxy resin composition has been applied to the coupling, the coupling is immediately moved into a heating zone where it is subjected for 2½ minutes to the action of air containing natural gas combustion products at a temperature of 625° F. The thus coated coupling was then immersed in the body of heated water works enamel in the dipping tank for 5 seconds and was then rotated in the air above the dipping tank which was at a temperature of 200° F. for about 90 seconds until the outer coating of water works enamel had congealed sufficiently that it no longer ran. The coupling was then removed and allowed to cool to room temperature which required about 2 hours.

EXAMPLE 3

A pipe coupling of the type shown, for example, in FIG. 1 of Pfefferle U.S. Patent No. 1,984,806, and of a size suitable for the interconnection of 12 in. pipe, with a wall thickness of ¼ in. and weighing 47 pounds, is thoroughly washed and rubbed with xylene and is then sand blasted to prepare a clean surface of coating, both the interior and the exterior of the coupling being treated in this manner. The thus cleaned coupling is then sprayed at room temperature with a phenolic resin coating composition sold under the trade name Royston Vinachrome A-908 by Royston Laboratories, Inc., Blawnox, Pittsburgh 38, Pennsylvania. This composition is a liquid having a Zahn #2 viscosity of 55 seconds.

The coating thus applied is allowed to become dry to the touch without becoming fully cured which requires about 20 minutes. The coal-tar pitch epoxy resin coating composition prepared within the preceding 45 minutes by introducing into a 25 gallon tank 20 gallons of an epoxy resin preparation having the following composition:

| | Weight percent |
|---|---|
| Epoxy ether resin from bis-phenol A and epichlorhydrin (melting point 9° C. and epoxy value 0.50) | 31 |
| Aromatic high-flash naphtha | 20 |
| Coal-tar pitch | 33 |
| Talc | 16 | to which is added 1 gallon of diethylene triamine as curing agent, was then sprayed at room temperature upon all surfaces of the coupling to provide a thickness of about 5 mils. There is also prepared in a dipping tank a supply of 20 gallons of a water works enamel meeting the AWWA C203-4 specification set forth above, sold under the name Waterworks Enamel, and having the following characteristics.

| | |
|---|---|
| Specific gravity at 25° C. | 1.40–1.50 |
| Softening point (degrees F., ASTM D-36) | [1] 220 |
| Penetration ASTM D-5: | |
| 100 g. 5 sec., 77 F. | 10–20 |
| 200 g. 5 sec., 77 F. | ----- |
| 50 g. 5 sec., 115 F. | 15–55 |
| Ash, mineral filler, percent by weight | 25–35 |
| Sag test: | |
| 7 hrs. at 120 F. | ----- |
| 7 hrs. at 140 F. | ----- |
| 24 hrs. at 160 F., inch | [2] 1/16 |
| 24 hrs. at 180 F. | ----- |
| Cold cracking test: | |
| 5 hrs. at 30 F. | ----- |
| 5 hrs. at 0 F. | ----- |
| 5 hrs. at −10 F. | ----- |
| 5 hrs. at −20 F. | ----- |
| Spark test: 10,000 volts low amperage | None |
| | None |

[1] Minimum.
[2] Maximum.

This enamel is heated to 470° F. to render it fluid. After the coal-tar pitch epoxy resin composition has been applied to the coupling, the coupling is immediately moved into a heating zone where its is subjected for 3½ minutes to the action of air containing natural gas combustion products at a temperature of 625° F. The thus coated coupling was then immersed in the body of heated water works enamel in the dipping tank for 8 seconds and was then rotated in the air above the dipping tank which was at a temperature of 250° F. for about 1½ minutes until the outer coating of water works enamel had congealed sufficiently that it no longer ran. The coupling was then removed and allowed to cool to room temperature which required about 2 hours.

While I do not wish to be bound by any particular theory, it is my belief that as a result of the application of the coating of bituminous enamel to the coating of the coal-tar pitch-epoxy resin composition before the latter has cured to any substantial extent, there is an interstitial migration of the two compositions at the interface between them which results in an interstitial keying between the two coatings to provide the high impact resistance which the dual coating possesses.

It will be obvious to those skilled in the art that various changes and modifications may be made in the embodiments described above without departing from the invention as defined in the appended claims and it is intended, therefore, that all matter contained in the foregoing description shall be interpreted as illustrative only and not as limitative of the invention.

This application is a continuation-in-part of my co-pending application Serial No. 759,381, filed September 8, 1958, now abandoned.

What I claim and desire to secure by Letters Patent is:

1. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin, heating said coating to effect partial curing of said composition, and, before said last-named coating has cured substantially applying to said last-named coating a coating of a bituminous enamel, and allowing said enamel coating to dry, whereby an interstitial migration of said coal tar pitch and epoxy resin composition and said bituminous enamel occurs at the interface thereof, resulting in an interstitial keying between the two coatings.

2. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin, heating said coating to effect a partial curing of said composition by exposing it to a heated gaseous medium at a temperature of 200 to 500° F. and, before said last-named coating has cured substantially applying to said last-named coating a coating of a bituminous enamel, and allowing said enamel coating to dry, whereby an interstitial migration of said coal-tar pitch and epoxy resin composition and said bituminous enamel occurs at the interface thereof, resulting in an interstitial keying between the two coatings.

3. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin, heating said coating to effect a partial curing of said composition by exposing it to a heated gaseous medium at a temperature of 200 to 500° F. and, before said last-named coating has cured substantially, applying to said last-named coating a coating of a bituminous enamel at a temperature of 450° to 525° F., and allowing said enamel coating to dry, whereby an interstitial migration of said coal-tar pitch and epoxy resin composition and said bituminous enamel occurs at the interface thereof, resulting in an interstitial keying between the two coatings.

4. A method of providing on a coatable supporting surface a coating resistant to disbonding from said surface upon impact which comprises the steps of applying to said surface a coating of a composition containing coal-tar pitch and an epoxy resin in the ratio of 15 to 50 parts epoxy resin and 50 to 85 parts coal-tar pitch in the presence of a curing agent for said epoxy resin, heating said coating to effect partial curing of said composition and, before said last-named coating has cured substantially, applying to said last-named coating a coating of a bituminous enamel and allowing said enamel coating to dry, whereby an interstitial migration of said coal tar pitch and epoxy resin composition and said bituminous enamel occurs at the interface thereof, resulting in an interstitial keying between the two coatings.

5. A method of providing on a coatable supporting surface a coating resistant to disbonding from said surface upon impact which comprises the steps of applying to said surface a coating of a composition containing coal-tar pitch and an epoxy resin in the ratio of 15 to 50 parts epoxy resin and 50 to 85 parts coal-tar pitch in the presence of a curing agent for said epoxy resin, heating said coating to effect a partial curing of said composition by exposing it to a heated gaseous medium at a temperature of 200 to 500° F. and, before said last-named coating has cured substantially, applying to said last-named coating a coating of a bituminous enamel and allowing said enamel coating to dry, whereby an interstitial migration of said coal tar pitch and epoxy resin composition and said bituminous enamel occurs at the interface thereof, resulting in an interstitial keying between the two coatings.

6. A method of providing on a coatable supporting surface a coating resistant to disbonding from said surface upon impact which comprises the steps of applying to said surface a coating of a composition containing coal-tar pitch and an epoxy resin in the ratio of 15 to 50 parts epoxy resin and 50 to 85 parts coal-tar pitch in the presence of a curing agent for said epoxy resin, heating said coating to effect a partial curing of said composition by exposing it to a heated gaseous medium at a temperature of 200 to 500° F. and, before said last-named coating has cured substantially, applying to said last-named coating a coating of a bituminous enamel at a temperature of 450° to 525° F., and allowing said enamel coating to dry, whereby an interstitial migration of said coal tar pitch and epoxy resin composition and said bituminous enamel occurs at the interface thereof, resulting in an interstitial keying between the two coatings.

7. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin, heating said coating to effect partial curing of said composition and, before said last-named coating has cured substantially, applying to said last-named coating a coating of a bituminous enamel having a softening point of at least 190° F., a penetration of 77° F. of at least 0, and an ash value of at least 20% by weight and allowing said enamel coating to dry, whereby an interstitial migration of said coal tar pitch and epoxy resin composition and said bituminous enamel occurs at the interface thereof, resulting in an interstitial keying between the two coatings.

8. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin, heating said coating to effect a partial curing of said composition by exposing it to a heated gaseous medium at a temperature of 200 to 500° F. and, before said last-named coating has cured substantially, applying to said last-named coating a coating of a bituminous enamel having a softening point of at least 190° F., a penetration at 77° F. of at least 0, and an ash value of at least 20% by weight and allowing said enamel coating to dry, whereby an interstitial migration of said coal tar pitch and epoxy resin composition and said bituminous enamel occurs at the interface thereof, resulting in an interstitial keying between the two coatings.

9. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin, heating said coating to effect a partial curing of said composition by exposing it to a heated gaseous medium at a temperature of 200 to 500° F. and, before said last-named coating has cured substantially, applying to said last-named coating a coating of a bituminous enamel having a softening point of at least 190° F., a penetration at 77° F. of at least 0, and an ash value of at least 20% by weight, at a temperature of 450° to 525° F., and allowing said enamel coating to dry, whereby an interstitial migration of said coal tar pitch and epoxy resin composition and said bituminous enamel occurs at the interface thereof, resulting in an interstitial keying between the two coatings.

10. A method of providing on a coatable supporting surface a coating resistant to disbonding from said surface upon impact which comprises the steps of applying to said surface a coating of a composition containing coal-tar pitch and an epoxy resin in the ratio of 15 to 50 parts epoxy resin and 50 to 85 parts coal-tar pitch in the presence of a curing agent for said epoxy resin, heating said coating to effect a partial curing of said composition by exposing it to a heated gaseous medium at a temperature of 200 to 500° F. and, before said last-named coating has cured substantially, applying to said last-named coating a coating of a bituminous enamel having a softening point of at least 190° F., a penetration at 77° F. of at least 0, and an ash value of at least 20% by weight, at a temperature of 450° to 525° F., and allowing said enamel coating to dry, whereby an interstitial migration of said coal tar pitch and epoxy resin composition and said bituminous enamel occurs at the interface thereof, resulting in an interstitial keying between the two coatings.

11. A method of providing on a coupling a coating resistant to disbonding from the surface of said coupling which comprises the steps of applying to said coupling surface a coating of a composition containing coal-tar pitch and an epoxy resin in the presence of a curing agent for said epoxy resin, heating said coating to effect a partial curing of said composition by exposing it to a heated gaseous medium at a temperature of 200 to 500° F. and, before said last-named coating has cured substantially, applying to said last-named coating a coating of a bituminous enamel at a temperature of 450° to 525° F., and allowing said enamel coating to dry, whereby an interstitial migration of said coal tar pitch and epoxy resin composition and said bituminous enamel occurs at the interface thereof, resulting in an interstitial keying between the two coatings.

12. A method of providing on a pipe a coating resistant to disbonding from the surface of said pipe upon impact which comprises the steps of applying to said pipe surface a coating of a composition containing coal-tar pitch and an epoxy resin in the presence of a curing agent for said epoxy resin, heating said coating to effect a partial curing of said composition by exposing it to a heated gaseous medium at a temperature of 200 to 500° F. and, before said last-named coating has cured substantially, applying to said last-named coating a coating of a bituminous enamel at a temperature of 450° to 525° F., and allowing said enamel coating to dry, whereby an interstitial migration of said coal tar pitch and epoxy resin composition and said bituminous enamel occurs at the interface thereof, resulting in an interstitial keying between the two coatings.

13. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin, heating said coating to effect a partial curing of said composition by exposing it to a heated gaseous medium at a temperature of 200 to 500° F., and, before said last-named coating has cured substantially, applying to said last-named coating a coating of a bituminous enamle formed from coal-digestion pitch and having a softening point of at least 220° F., a penetration of at least 15 at 115° F., and an ash value of at least 25% by weight at a temperature of 450° to 525° F., and allowing said enamel coating to dry, whereby an interstitial migration of said coal tar pitch and epoxy resin composition and said bituminous enamel occurs at the interface thereof, resulting in an interstitial keying between the two coatings.

14. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin, heating said coating to effect a partial curing of said composition by exposing it to a heated gaseous medium at a temperature of 200 to 500° F., and, before said last-named coating has cured substantially, applying to said last-named coating a coating of a bituminous enamel having a softening point of at least 190° F., a penetration at 115° F., of 2 to 55, and an ash value of 20 to 35% by weight at a temperature of 450° to 525° F., and allowing said enamel coating to dry, whereby an interstitial migration of said coal tar pitch and epoxy resin composition and said bituminous enamel occurs at the interface thereof, resulting in an interstitial keying between the two coatings.

15. A supporting surface coated with a multiphase coating highly resistant to disbonding from said surface upon impact, said multiphase coating consisting essentially of an underlying coating of a cured composition containing coal-tar pitch and an epoxy resin and a superposed coating of a bituminous enamel, said underlying coating and said superposed coating being united by interstitial keying of their respective compositions resulting from application of said underlying coating to said surface, heating said underlying coating to effect partial curing of said composition and, before said underlying coating has cured substantially, applying said superposed coating.

16. A supporting surface coated with a multiphase coating highly resistant to disbonding from said surface upon impact, said multiphase coating consisting essentially of an underlying coating of a cured composition containing coal-tar pitch and an epoxy resin and a superposed coating of a bituminous enamel, said underlying coating and said superposed coating being united by interstitial keying of their respective compositions resulting from application of said underlying coating to said surface, heating said underlying coating to effect partial curing of said composition by exposing it to a heated gaseous medium at a temperature of 200 to 500° F., and, before said underlying coating has cured substantially, applying said superposed coating.

17. A supporting surface coated with a multiphase coating highly resistant to disbonding from said surface upon impact, said multiphase coating consisting essentially of an underlying coating of a cured composition containing coal-tar pitch and an epoxy resin and a superposed coating of a bituminous enamel, said underlying coating and said superposed coating being united by interstitial keying of their respective compositions resulting from application of said underlying coating to said surface, heating said underlying coating to effect partial curing of said composition by exposing it to a heated gaseous medium at a tempertaure of 200 to 500° F., and, before said underlying coating has cured substantially, applying said superposed coating at a temperature of 450° to 525° F.

18. A supporting surface coated with a multiphase coating highly resistant to disbonding from said surface upon impact, said multiphase coating consisting essentially of an underlying coating of a cured composition containing coal-tar pitch and an epoxy resin in the ratio of 15 to 50 parts epoxy resin and 50 to 85 parts coal-tar pitch and a superposed coating of a bituminous enamel having a softening point of at least 190° F., a penetration at 77° F., of at least 0, and an ash value of at least 20% by weight, said underlying coating and said superposed coating being united by interstitial keying of their respective compositions resulting from application of said underlying coating to said surface, heating said underlying coating to effect partial curing of said composition and, before said underlying coating has cured substantially, applying said superposed coating.

19. A supporting surface coated with a multiphase coating highly resistant to disbonding from said surface upon impact, said multiphase coating consisting essentially of an underlying coating of a cured composition containing coal-tar pitch and an epoxy resin in the ratio of 15 to 50 parts epoxy resin and 50 to 85 parts coal-tar pitch and a superposed coating of a bituminous enamel having a softening point of at least 190° F., a penetration at 77° F., of at least 0, and an ash value of at least 20% by weight, said underlying coating and said superposed coating being united by interstitial keying of their respective compositions resulting from application of said underlying coating to said surface, heating said underlying coating to effect partial curing of said composition by exposing it to a heated gaseous medium at a temperature of 200 to 500° F., and, before said underlying coating has cured substantially, applying said superposed coating.

20. A supporting surface coated with a multiphase coating highly resistant to disbonding from said surface upon impact, said multiphase coating consisting essentially of an underlying coating of a cured composition containing coal-tar pitch and an epoxy resin in the ratio of 15 to 50 parts epoxy resin and 50 to 85 parts coal-tar pitch and a superposed coating of a bituminous enamel having a softening point of at least 190° F., a penetration at 77° F., of at least 0, and an ash value of at least 20% by weight, said underlying coating and said superposed coating being united by interstitial keying of their respective compositions resulting from application of said underlying coating to said surface, heating said underlying coating to effect a partial curing of said composition by exposing it to a heated gaseous medium at a temperature of 200 to 500° F., and, before said underlying coating has cured substantially, applying said superposed coating at a temperature of 450° to 525° F.

21. A method of providing a coatable supporting surface a coating resistant to disbonding from said surface upon impact which comprises the steps of applying to said surface a coating of a composition containing coal-tar pitch and an epoxy resin in the presence of a curing agent for said epoxy resin, heating said coating to effect a partial curing of said composition by exposing it to a heated gaseous medium at a temperature of 200 to 500° F. and, before said last-named coating has cured substantially, applying to said last-named coating a coating of a bituminous enamel having a softening point of at least 190° F., a penetration at 77° F. of at least 0, and an ash value of at least 20% by weight at a temperature of 450° to 525° F., by dipping said surface in a body of said enamel for about 2 to 5 seconds, rotating said surface above said body until it no longer runs, and allowing said enamel coating to dry, whereby an interstitial migration of said coal tar pitch and epoxy resin composition and said bituminous enamel occurs at the interface thereof, resulting in an interstitial keying between the two coatings.

22. A method of providing on a coatable supporting surface a coating resistant to disbonding from said surface upon impact which comprises the steps of applying to said surface a coating of a composition containing coal-tar pitch and an epoxy resin in the ratio of 15 to 50 parts epoxy resin and 50 to 85 parts coal-tar pitch in the presence of a curing agent for said epoxy resin, heating said coating to effect a partial curing of said composition by exposing it to a heated gaseous medium at a temperature of 200 to 500° F. and, before said last-named coating has cured substantially, applying to said last-named coating a coating of a bituminous enamel having a softening point of at least 190° F., a penetration at 77° F. of at least 0, and an ash value of at least 20% by weight at a temperature of 450° to 525° F. by dipping said surface in a body of said enamel for about 2 to 5 seconds, rotating said surface above said body until it no longer runs, and allowing said enamel coating to dry, whereby an interstitial migration of said coal tar pitch and epoxy resin composition and said bituminous enamel occurs at the interface thereof, resulting in an interstitial keying between the two coatings.

23. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin and, before said last-named coating has cured substantially, applying to said last-named coating a coating of a bituminous enamel, and allowing said enamel coating to dry, whereby an interstitial migration of said coal tar pitch and epoxy resin composition and said bituminous enamel occurs at the interface thereof, resulting in an interstitial keying between the two coatings.

24. A method of providing on a coatable supporting surface a coating resistant to disbonding from said surface upon impact which comprises the steps of applying to said surface a coating of a composition containing coal-tar pitch and an epoxy resin in the ratio of 15 to 50 parts epoxy resin and 50 to 85 parts coal-tar pitch in the presence of a curing agent for said epoxy resin and, before said last-named coating has cured substantially, applying to said last-named coating a coating of a bituminous enamel and allowing said enamel coating to dry, whereby an interstitial migration of said coal tar pitch and epoxy resin composition and said bituminous enamel occurs at the interface thereof, resulting in an interstitial keying between the two coatings.

25. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin and, before said last-named coating has cured substantially, applying to said last-named coating a coating of a bituminous enamel having a softening point of at least 190° F., a penetration at 77° F. of at least 0, and an ash value of at least 20% by weight and allowing said enamel coating to dry, whereby an interstitial migration of said coal tar pitch and epoxy resin composition and said bituminous enamel occurs at the interface thereof, resulting in an interstitial keying between the two coatings.

26. A method of providing on a coatable supporting surface a coating resistant to disbonding from said surface upon impact which comprises the steps of applying to said surface a coating of a composition containing coal-tar pitch and an epoxy resin in the ratio of 15 to 50 parts epoxy resin and 50 to 85 parts coal-tar pitch in the presence of a curing agent for said epoxy resin and, before said last-named coating has cured substantially, applying to said last-named coating a coating of a bituminous enamel having a softening point of at least 190° F., a penetration at 77° F. of at least 0, and an ash value of at least 20% by weight, and allowing said enamel coating to dry, whereby an interstitial migration of said coal tar pitch and epoxy resin composition and said bituminous enamel occurs at the interface thereof, resulting in an interstitial keying between the two coatings.

27. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin and, before said last-named coating has cured substantially, applying to said last-named coating a coating of a bituminous enamel formed from coal-digestion pitch and having a softening point of at least 220° F., a penetration of at least 15 at 115° F. and an ash value of at least 25% by weight, and allowing said enamel coating to dry, whereby an interstitial migration of said coal tar pitch and epoxy resin composition and said bituminous enamel occurs at the interface thereof, resulting in an interstitial keying between the two coatings.

28. A method of providing on a coatable supporting surface a coating resistant to disbonding from said surface upon impact which comprises the steps of applying to said surface a coating of a composition containing coal-tar pitch and an epoxy resin in the presence of a curing agent for said epoxy resin and, before said last-named coating has cured substantially, applying to said last-named coating a coating of a bituminous enamel having a softening point of at least 190° F., a penetration at 115° F. of 2 to 55, and an ash value of 20 to 35% by weight, and allowing said enamel coating to dry, whereby an intersitial migration of said coal tar pitch and epoxy resin composition and said bituminous enamel occurs at the interface thereof, resulting in an intersitial keying between the two coatings.

29. A supporting surface coated with a dual coating highly resistant to disbonding from said surface upon impact, said dual coating consisting essentially of an underlying coating of a cured composition containing coal-tar pitch and an epoxy resin and a superposed coating of a bituminous enamel, said underlying coating and said superposed coating being united by intersitial keying of their respective compositions resulting from application of said superposed coating to said underlying coating before the underlying coating has substantially cured.

30. A supporting surface coated with a dual coating highly resistant to disbonding from said surface upon impact, said dual coating consisting essentially of an underlying coating of a cured composition containing coal-tar pitch and an epoxy resin in the ratio of 15 to 50 parts epoxy resin and 50 to 85 parts coal-tar pitch and a superposed coating of a bituminous enamel, said underlying coating and said superposed coating being united by intersitial keying of their respective compositions resulting from application of said superposed coating to said underlying coating before the underlying coating has substantially cured.

31. A supporting surface coated with a dual coating highly resistant to disbonding from said surface upon impact, said dual coating consisting essentially of an underlying coating of a cured composition containing coal-tar pitch and an epoxy resin and a superposed coating of a bituminous enamel having a softening point of at least 190° F., a penetration at 77° F. of at least 0, and an ash value of at least 20% by weight, said underlying coating and said superposed coating being united by intersitial keying of their respective compositions resulting from application of said superposed coating to said underlying coating before the underlying coating has substantially cured.

32. A supporting surface coated with a dual coating highly resistant to disbonding from said surface upon impact, said dual coating consisting essentially of an underlying coating of a cured composition containing coal-tar pitch and an epoxy resin in the ratio of 15 to 50 parts epoxy resin and 50 to 85 parts coal-tar pitch and a superposed coating of a bituminous enamel having a softening point of at least 190° F., a penetration at 77° F. of at least 0, and an ash value of at least 20% by weight, said underlying coating and said superposed coating being united by intersitial keying of their respective compositions resulting from application of said superposed coating to said underlying coating before the underlying coating has substantially cured.

33. A surface coated with a dual coating highly resistant to disbonding from said surface upon impact, said dual coating consisting essentially of an underlying coating of a cured composition containing coal-tar pitch and an epoxy resin and a superposed coating of a bituminous enamel, said underlying coating and said superposed coating being united by intersitial keying of their respective compositions resulting from application of said superposed coating to said underlying coating before the underlying coating has substantially cured.

34. A pipe surface coated with a dual coating highly resistant to disbonding from said surface upon impact, said dual coating consisting essentially of an underlying coating of a cured composition containing coal-tar pitch and an epoxy resin and a superposed coating of a bituminous enamel, said underlying coating and said superposed coating being united by intersitial keying of their respective compositions resulting from application of said superposed coating to said underlying coating before the underlying coating has substantially cured.

35. A supporting surface coated with a dual coating highly resistant to disbonding from said surface upon impact, said dual coating consisting essentially of an underlying coating of a cured composition containing coal-tar pitch and an epoxy resin and a superposed coating of a bituminous enamel formed from coal-digestion pitch and having a softening point of at least 220° F., a penetration of at least 15 to 115° F., and an ash value of at least 25% by weight, said underlying coating and said superposed coating being united by intersitial keying of their respective compositions resulting from application of said superposed coating to said underlying coating before the underlying coating has substantially cured.

36. A supporting surface coated with a dual coating highly resistant to disbonding from said surface upon impact, said dual coating consisting essentially of an underlying coating of a cured composition containing coal-tar pitch and an epoxy resin and a superposed coating of a bituminous enamel having a softening point of at least 190° F., a penetration at 115° F. of 2 to 55, and an ash value of 20 to 35% by weight, said underlying coating and said superposed coating being united by intersitial keying of their respective compositions resulting from application of said superposed coating to said underlying coating before the underlying coating has substantially cured.

37. A supporting surface coated with a dual coating highly resistant to disbonding from said surface upon impact, said dual coating consisting essentially of an underlying coating of a cured composition containing coal-tar pitch and an epoxy resin in the ratio of 15 to 50 parts epoxy resin and 50 to 85 parts coal-tar pitch and a superposed coating of a bituminous enamel having a softening point of at least 190° F., a penetration at 115° F. of 2 to 55, and an ash value of 20 to 35% by weight, said underlying coating and said superposed coating being united by intersitial keying of their respective compositions resulting from application of said superposed coating to said underlying coating before the underlying coating has substantially cured.

References Cited in the file of this patent
UNITED STATES PATENTS

| | | |
|---|---|---|
| 1,381,736 | Prichard | June 14, 1921 |
| 2,170,314 | Williams | Aug. 22, 1939 |
| 2,707,157 | Stanton et al. | Apr. 26, 1955 |
| 2,749,250 | Christensen et al. | June 5, 1956 |
| 2,765,288 | Whittier | Oct. 2, 1956 |
| 2,864,722 | Millar et al. | Dec. 16, 1958 |